United States Patent
Akita

(10) Patent No.: US 6,853,393 B2
(45) Date of Patent: Feb. 8, 2005

(54) PICTURE READING DEVICE AND IMAGE FORMING APPARATUS

(75) Inventor: Masanori Akita, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/612,151

(22) Filed: Jul. 3, 2003

(65) Prior Publication Data

US 2004/0005157 A1 Jan. 8, 2004

(30) Foreign Application Priority Data

Jul. 8, 2002 (JP) .............................. 2002-198816

(51) Int. Cl.⁷ .............................................. B41J 2/385
(52) U.S. Cl. .................. 347/129; 382/108; 250/559.06; 356/429
(58) Field of Search .............................. 382/108; 347/5, 347/14, 16, 19, 105–106, 129–130, 153, 177, 193, 225, 238, 246, 262; 250/559.16, 559.17, 559.18, 559.01, 559.05, 559.06, 559.24, 559.29; 356/429; 377/8

(56) References Cited

U.S. PATENT DOCUMENTS

| | | | |
|---|---|---|---|
| 4,760,271 A | * | 7/1988 | Brenholdt .............. 250/559.05 |
| 5,004,928 A | * | 4/1991 | Suzuki et al. .......... 250/559.16 |
| 5,568,256 A | * | 10/1996 | Körner et al. .............. 356/359 |
| 5,925,889 A | | 7/1999 | Guillory et al. ........ 250/559.16 |
| 5,973,772 A | * | 10/1999 | Fukuma et al. ............. 356/124 |
| 5,985,495 A | * | 11/1999 | Okumura et al. ............. 430/22 |
| 6,091,513 A | * | 7/2000 | Ishihara et al. .............. 358/1.9 |
| 6,370,216 B1 | | 4/2002 | Lawandy et al. .............. 377/8 |
| 6,373,966 B1 | * | 4/2002 | Fujii et al. ................... 382/112 |
| 2001/0014165 A1 | * | 8/2001 | Fujioka ...................... 382/103 |
| 2001/0035460 A1 | * | 11/2001 | Nakajima et al. ...... 235/462.43 |
| 2002/0054299 A1 | * | 5/2002 | Freifeld ................. 250/559.19 |

FOREIGN PATENT DOCUMENTS

| | | |
|---|---|---|
| JP | 11-216938 | 8/1999 |
| JP | 11-271037 | 10/1999 |

* cited by examiner

Primary Examiner—Eugene H. Eickholt
(74) Attorney, Agent, or Firm—Fitzpatrick, Cella, Harper & Scinto

(57) ABSTRACT

In a picture reading device having a light emitting element that obliquely irradiates the surface of a paper with light, an area sensor that reads its irradiated area as a picture in which information related to a paper is read on the basis of the read results, the light irradiating element is arranged with an angle so as to irradiate the light from a direction oblique to a conveying direction of the paper. As a result, the picture reading device of the present invention eliminates such a problem that the same paper surface is received as a different image depending on the incident direction of the light, and the information related to an object to be read cannot be accurately read.

13 Claims, 9 Drawing Sheets

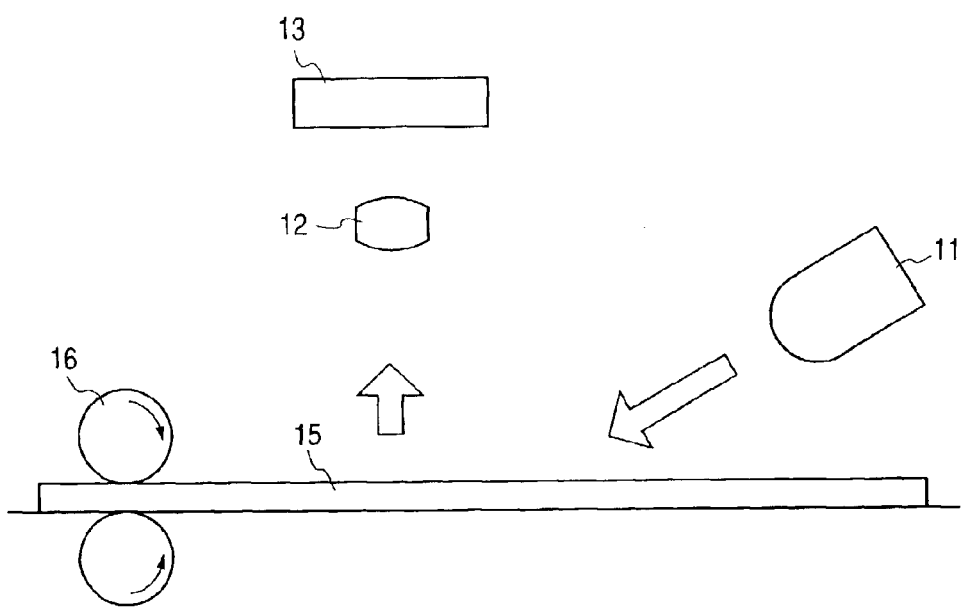
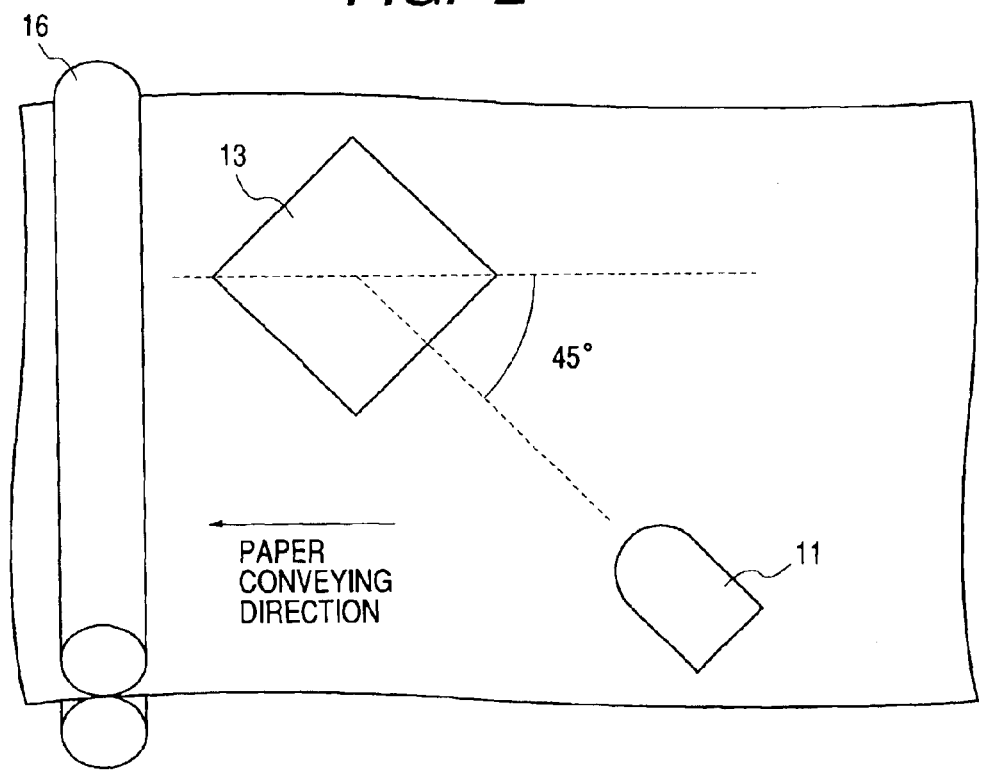

FIG. 9
FIG. 10
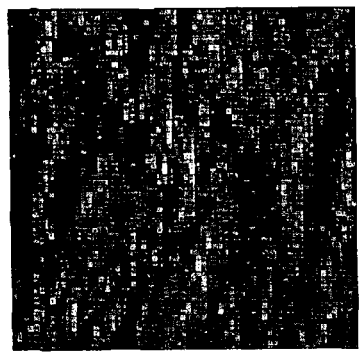
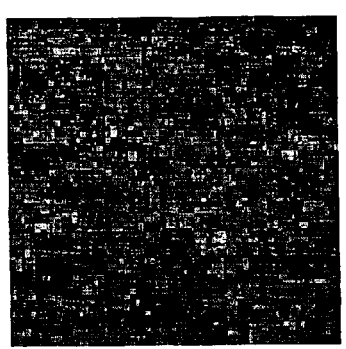
FIG. 11
FIG. 12
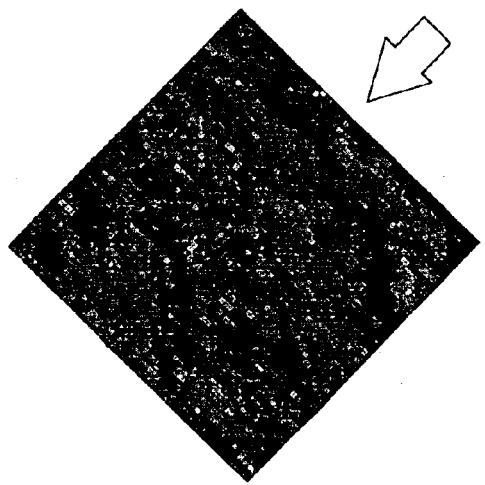
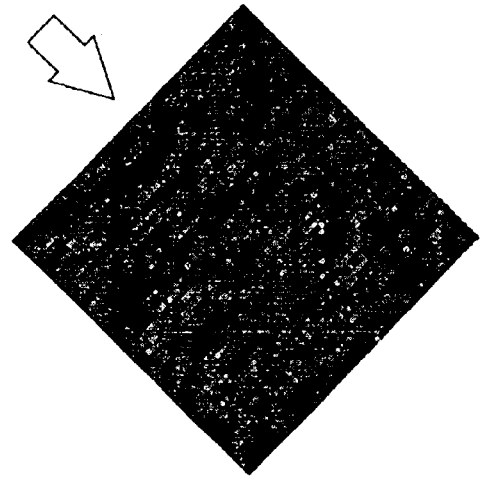

PICTURE READING DEVICE AND IMAGE FORMING APPARATUS

BACKGROUND OF THE INVENTION

1. Field of the Invention

The present invention relates to an image forming apparatus such as a laser printer or an ink jet printer, and a picture reading device applicable to the image forming apparatus.

2. Related Background Art

An image forming apparatus such as a copying machine or a laser printer includes a latent image bearing member that bears a latent image, a developing apparatus that supplies a developer to the latent image bearing member to visualize the latent image as a developer image, transferring means that transfers the developer image visualized by the developing apparatus onto a recording material to be conveyed in a given direction, and a fixing apparatus that heats and pressurizes the recording material onto which the developer image has been transferred by the transferring means under given fixing process conditions, to thereby fix the developer image onto the recording material.

Up to now, in the above-mentioned image forming apparatus, control is made in such a manner that the size or the type (hereinafter also refer to as "paper type") of a recording paper which is the recording material is set by a user with, for example, an operation panel disposed on an image forming apparatus main body, and the fixing process conditions (for example, a fixing temperature and a conveying speed of the recording paper that passes through the fixing apparatus) are set in accordance with the set size or type of the recording paper.

Also, in the case where the recording paper is an overhead transparencies (OHT) sheet, control is made in such a manner that whether the recording paper is the OHT sheet, or not, is automatically judged by a transmission type sensor disposed inside the image forming apparatus, and in the case where a light is transmitted through the recording paper, a judgment is made that the recording paper is the OHT sheet, and in the case where the light is not transmitted through the recording paper, a judgment is made that the recording paper is a plain paper, and the fixing temperature or the conveying speed of the recording paper is set in accordance with the judgment result.

In recent years, there is an image forming apparatus in which a difference in quantity between a regularly reflected light and a diffusedly reflected light from the paper surface is detected, and the type of paper is automatically discriminated to conduct image forming control in accordance with the detected results, thereby being capable of obtaining an optimum image. FIG. 15 is a cross-sectional view showing a printer gloss meter disclosed in Japanese Patent Application Laid-open No. 11-216938. A gloss detecting device 200 has a block 240 mounted on a printed board 220. A light source tube 232 on an axis 233 and a reflection tube 214 on an axis 215 are formed in the block 240. A light source 216 is positioned in the light source tube 232. A photo sensor 222 is positioned in the reflection tube 214. In this case, the photo sensor 222 mainly reacts to a spectrally reflected light so as to discriminate a lower gloss paper and a higher gloss paper.

Also, there has been devised a method in which a CCD area sensor perceives the image on the paper surface, and a fractal dimensionality is found to obtain the relative roughness of the paper. FIG. 16 is a flowchart showing a process of the basic operation of a smoothness detecting device disclosed in Japanese Patent Application Laid-open No. 11-271037. Area irradiation onto the surface of a recording medium is performed (Step S2-1). Thereafter, a tint image formed by the reflected light of the area irradiation is read as a plain image by image detecting means including image reading means, and its tint information is detected as multivalued image data (Step S2-2). That is, the irradiated light comes to the reflected light that is tinted by concave and convex portions on the recording medium in such a manner that the concave portions are dark and the convex portions are bright, and the tint image is detected by a CCD that is the image reading means. The tint information which is the detected multivalued image data is subjected to image processing by information processing means, to thereby measure and calculate the surface roughness of the recording medium (Step S2-3). Thereafter, an image formation parameter value corresponding to the measured and calculated surface roughness is determined and controlled by image formation control means (Step S2-4). The surface roughness of the recording medium can be inferred from the tint information read from the CCD.

The surface contour of a fibrous material such as a paper has the directivity. In the case where such a surface contour of an object to be read with the directivity is measured by photographing and arithmetically operating (calculating) the surface contour, if an incident direction of the light source and a direction of the fibers are not kept constant, a variation occurs in the measured results. FIG. 9 shows a surface image in the case where a light is applied from a direction perpendicular to the fibrous direction. For example, in the case where the light is made incident perpendicularly to an angle at which the fibers of the paper are arranged as shown in FIG. 9, shadows produced by the concave and convex portions of the fibers articulately appear.

On the other hand, FIG. 10 shows a surface image in the case where a light is applied from a direction that is in parallel with the fibrous direction. As shown in FIG. 10, in the case where a light is made incident in the same direction as the fibrous direction, the shadows produced by the concave and convex portions of the fibers become weak.

As described above, there arises such a problem that the same paper surface is perceived as a different image depending on the incident direction of the light.

SUMMARY OF THE INVENTION

An object of the present invention is to solve the above-mentioned problems.

Another object of the present invention is to provide a picture reading device includes:

a light irradiating unit adapted to irradiate a surface of an object to be read with light;

a reading unit adapted to read an irradiated region irradiated by the light irradiating unit on the surface of the object to be read as a picture; and an arithmetically operating unit adapted to arithmetically operate information related to the object to be read on the basis of a read result of the reading unit, in which the light irradiating unit and the reading unit are arranged in such a manner that a line resulting from projecting a line connecting the light irradiating unit and the reading unit on a conveyance surface of the object to be read is oblique to a conveying direction on the conveyance surface of the object to be read.

A further object of the present invention, an image forming apparatus includes:

a light irradiating unit adapted to irradiate a surface of a recording material with light;

a reading unit adapted to read an irradiated region irradiated by the light irradiating unit on a surface of the recording material to be read as a picture; and an arithmetically operating unit adapted to arithmetically operate information related to the recording material on the basis of a read result of the reading unit, in which the light irradiating unit and the reading unit are arranged in such a manner that a line resulting from projecting a line connecting the light irradiating unit and the reading unit on a conveyance surface of the recording material is oblique to a conveying direction on the conveyance surface of the recording material.

The other objects, structures, and effects of the present invention will be apparent from the detailed description and the drawings given below.

BRIEF DESCRIPTION OF THE DRAWINGS

FIG. 1 is a structural diagram showing the outline of a picture reading device in accordance with a first embodiment;

FIG. 2 shows the picture reading device in accordance with the first embodiment and a photographed surface of an object to be read when being viewed from the top;

FIG. 9 shows a surface image in the case where an incident angle of a light source is arranged at 90 degrees with respect to a fibrous orientation angle in a problem to be solved by the present invention;

FIG. 10 shows a surface image in the case where an incident angle of a light source is arranged at 0 degree with respect to a fibrous orientation angle in a problem to be solved by the present invention;

FIG. 11 shows a surface image in the case where an incident angle of a light source is arranged at a right side by 45 degrees with respect to a fibrous orientation angle in a problem to be solved by the present invention;

FIG. 12 shows a surface image in the case where an incident angle of a light source is arranged at a left side by 45 degrees with respect to a fibrous orientation angle in a problem to be solved by the present invention;

DETAILED DESCRIPTION OF THE PREFERRED EMBODIMENTS

Figure 3:
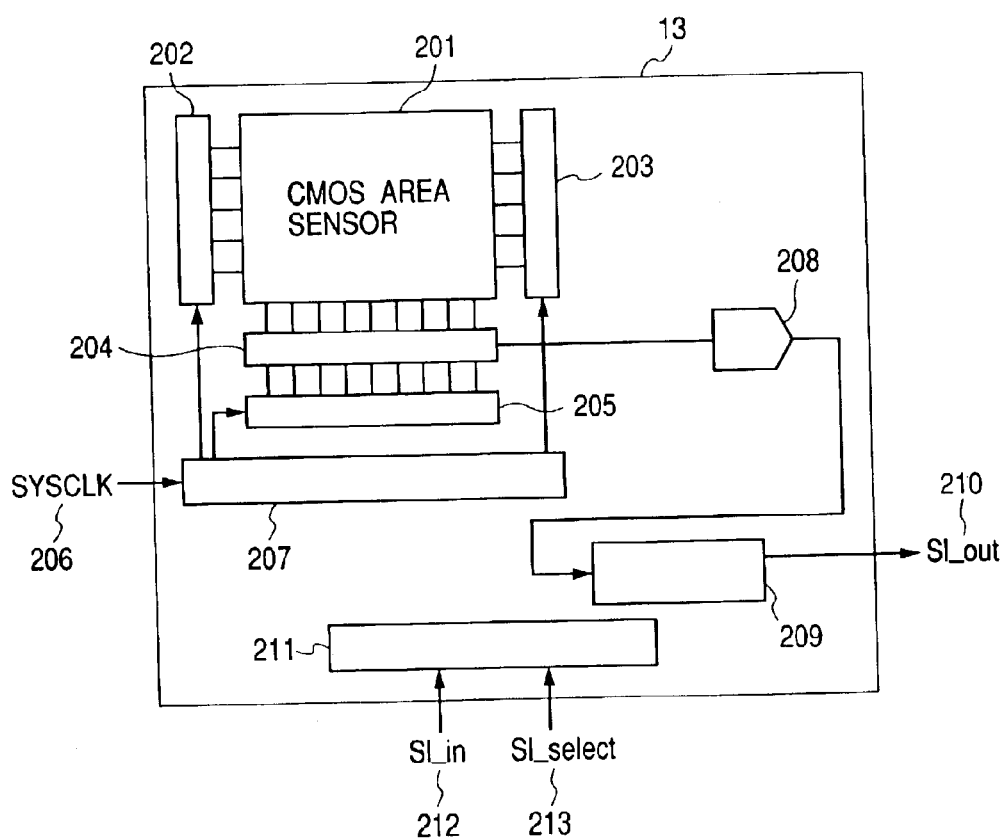
FIG. 3 is a circuit block diagram showing a CMOS area sensor in accordance with the first embodiment.

Now, a description will be given in more detail of preferred embodiments of the present invention with reference to the accompanying drawings.

(First Embodiment)

A first embodiment of the present invention will be described with reference to FIGS. 1 to 8. FIG. 1 is a structural diagram showing the outline of a picture reading device. Referring to FIG. 1, there are arranged a light source 11 serving as a light irradiating portion that irradiates light, a lens 12, a CMOS area sensor 13, a recording medium 15 that serves as an object to be read, and a conveying roller 16 for conveying the recording medium.

The light source 11, the lens 12 and the CMOS area sensor 13 are mounted on a board (not shown) so as to be integrated with each other as a picture reading device. Also, the CMOS area sensor 13 may be replaced by a CCD sensor that reads the image two-dimensionally, or may be replaced by a line sensor that reads the image linearly.

The recording medium 15 is irradiated with light from the light source 11, and an image on the surface of the recording medium 15 in that situation is imaged on the CMOS area sensor 13 through the lens 12.

FIG. 2 shows the picture reading device and a photographed surface of the object to be read when being viewed from right above (a direction perpendicular to the recording medium). Because the fibrous direction is longitudinal or lateral in many cases, when the paper is automatically conveyed and the measurement is automatically conducted, the incident direction of the light source is oblique to the fibrous direction of the sensor by 45 degrees, thereby being capable of keeping a state of substantially 45 degrees with respect to a direction along which the fibers of the paper are oriented, as a result of which a variation in the detected results can be made small.

In other words, the light source 11 and the CMOS area sensor are arranged in such a manner that a line resulting from projecting a line connecting the light source 11 and the CMOS area sensor on a conveyance surface is oblique to the conveying direction on the conveyance surface, for example, inclined with respect to the conveying direction with an angle of about 45 degrees.

In this example, it is not always necessary to provide 45 degrees. Since the oriented angle of the fibers is 15 degrees or less, if the angle is set within ±30 degrees, the variation in the detected results is effectively reduced.

In FIG. 2, not only the positional relationship between the light source 11 and the CMOS area sensor 13, but also the CMOS area sensor 13 itself is also obliquely arranged. However, the arrangement of the CMOS area sensor itself may not be obliquely arranged.

Subsequently, a circuit block diagram of the CMOS area sensor will be described with reference to FIG. 3.

In the figure, a CMOS sensor portion 201 has sensors for, for example, 64×64 pixels disposed two-dimensionally. Reference numerals 202 and 203 denote vertical shift registers, 204 denotes an output buffer, 205 denotes a horizontal shift register, 206 denotes a system clock, and 207 denotes a timing generator.

Subsequently, the operation will be described.

When an SI-select signal 213 is made active, the CMOS sensor portion 201 starts to accumulate charges based on the received light. Then, upon giving the system clock 206, the vertical shift registers 202 and 203 sequentially select the columns of read pixels by the timing generator 207 and sequentially sets data in the output buffer 204.

The data set in the output buffer 204 is transferred to an A/D converter 208 by the horizontal shift register 205. The pixel data that has been converted to digital data by the A/D converter 208 is controlled at a given timing by an output interface circuit 209, and outputted to an SI-out signal 210 while the SI-select signal 213 is active.

On the other hand, an A/D conversion gain can variably be controlled by a control circuit 211 in response to an SI-in signal 212.

For example, in the case where the contrast of the picked-up image is not obtained, a CPU changes the gain so that the image can always be picked up with the best contrast.

Subsequently, the calculating method will be described.

Figure 4:
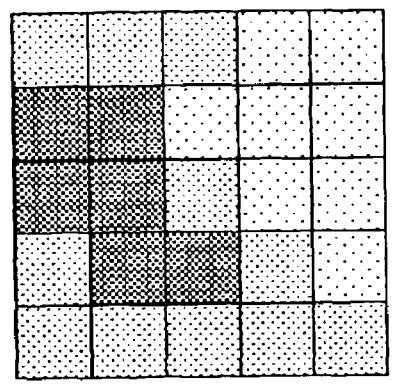
FIG. 4 is an explanatory diagram for explaining the first embodiment.
Figure 5:
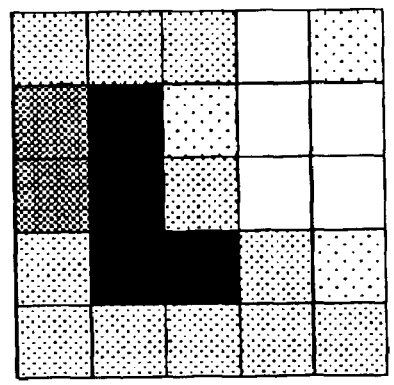
FIG. 5 is an explanatory diagram for explaining the first embodiment.

FIG. 5 shows an image on the surface of the recording medium 15 in the case where the concave and convex portions on the surface are large. FIG. 4 shows an image on the surface of the recording medium 15 in the case where the concave and convex portions on the surface are small. In this case, the contrast in the case where the surface concave and convex portions are large becomes higher than that in the case where concave and convex portions on the surface are small. The contrast can be calculated by arithmetically operating (calculating) a difference between the maximum value and the minimum value of the detected results. Therefore, the size of the concave and convex portions on the surface can be detected by calculating the difference between the maximum value and the minimum value.

Figure 6:
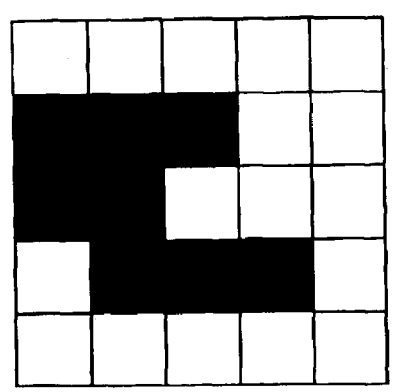
FIG. 6 is an explanatory diagram for explaining the first embodiment.

FIG. 6 shows an image when the above-mentioned image on the paper is binarized. The width of the concave and convex portions can be calculated by counting the number of edges of the image resulting from binarizing the image on the surface.

The surface flatness is measured by using the detected results of any one or both of the size of the concave and convex portions and the width of the concave and convex portions.

Subsequently, an image forming apparatus on which the picture reading device is mounted will be described.

Figure 7:
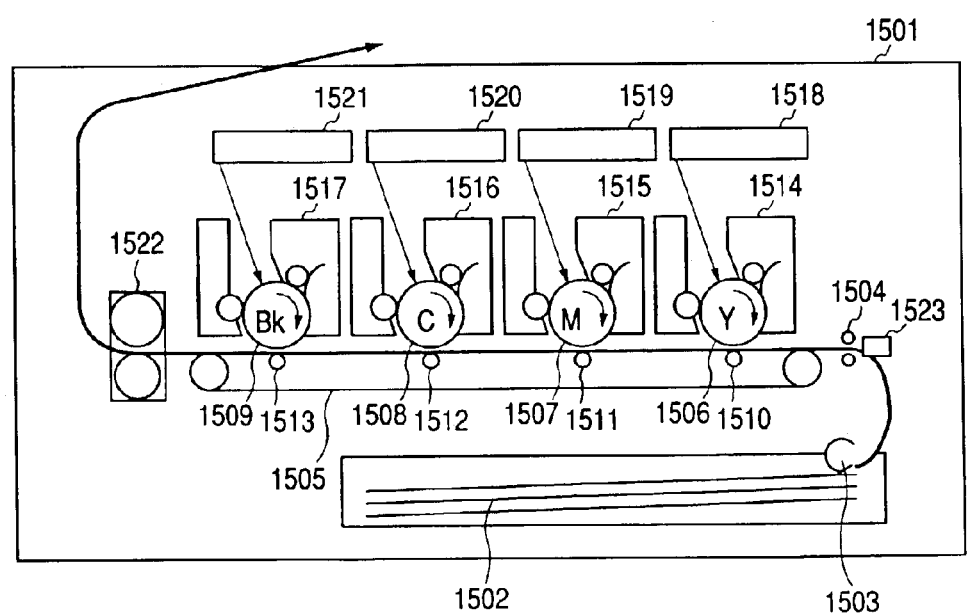
FIG. 7 is a structural diagram showing an image forming apparatus in accordance with the first embodiment.

FIG. 7 is a diagram showing an image forming apparatus in accordance with a first embodiment of the present invention.

In the figure, an image forming apparatus 1501 has arranged therein a paper cassette 1502, a paper feeding roller 1503, a transferring belt driving roller 1504, a transferring belt 1505, photosensitive drums 1506 to 1509 for yellow, magenta, cyan and black, transferring rollers 1510 to 1513, cartridges 1514 to 1517 for yellow, magenta, cyan and black, optical units 1518 to 1521 for yellow, magenta, cyan and black, and a fixing unit 1522.

The image forming apparatus transfers images of yellow, magenta, cyan and black on a recording paper by using an electrophotographic process in a superimposing manner, and thermally fixes a toner image by the fixing roller under a temperature control.

Also, the optical units for the respective colors are so structured as to form a latent image by exposing and scanning the surfaces of the respective photosensitive drums with a laser beam, and a series of those image forming operation is scanning-controlled in synchronism in such a manner that the image is transferred from a predetermined position on the conveyed recording paper.

In addition, the image forming apparatus includes a paper feeding motor that feeds and conveys the recording paper which is a recording material, a transferring belt driving motor that drives the transferring belt driving roller, a photosensitive drum driving motor that drives the photosensitive drums for the respective colors and the transferring roller, and a fixing driving motor that drives the fixing roller.

An image reading sensor 1523 irradiates the surface of a recording paper which is fed and conveyed with light, converges and images its reflected light, and detects an image on a specific area of the recording material.

A control CPU (not shown) provided in the image forming apparatus allows the fixing unit 1522 to supply a desired quantity of heat to the recording paper, thereby melting and fixing the toner image on the recording paper.

Subsequently, the operation of the control CPU will be described with reference to FIG. 8.

Figure 8:
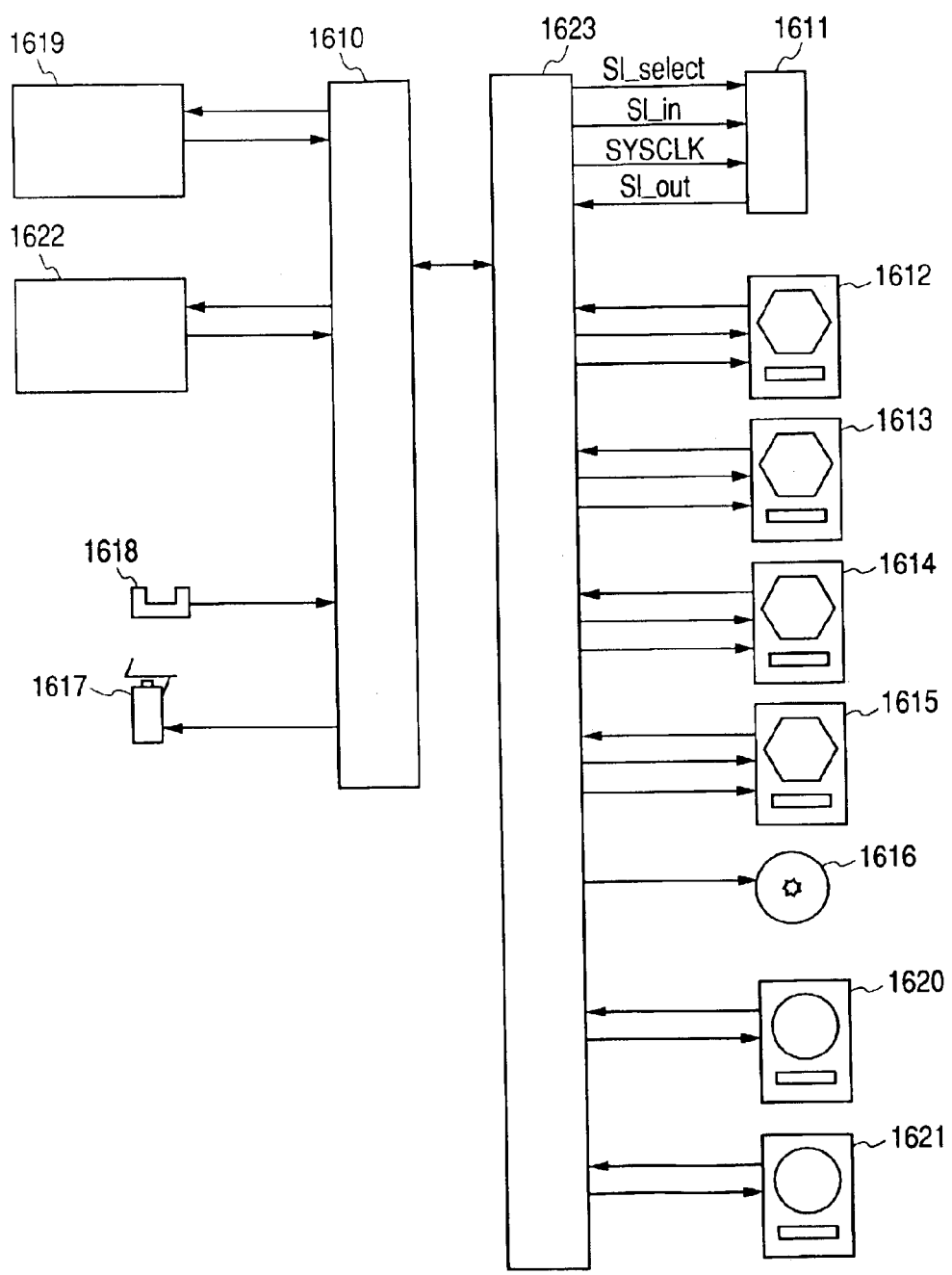
FIG. 8 is a structural diagram showing a processing system of the image forming apparatus in accordance with the first embodiment.

FIG. 8 is a diagram showing the structure of the respective units that are controlled by the control CPU.

In the figure, reference numeral 1610 denotes a CPU, and reference numeral 1611 denotes a CMOS sensor. Optical units 1612 to 1615 each include a polygon mirror, a motor and a laser, and scan the surface of the photosensitive drum with a laser beam to draw a desired latent image. A paper feeding motor 1616 conveys the recording material. Reference numeral 1617 denotes a paper feed solenoid used at the time of starting the driving of the paper feeding roller for feeding the recording material. A paper presence/absence sensor 1618 detects whether the recording paper is set at a given position, or not. A high voltage power supply 1619 controls primary charging, developing, primary transfer, and secondary transfer bias which are necessary for the electrophotoelectric process. A drum driving motor 1620 drives the photosensitive drum and the transferring roller. Reference numeral 1621 denotes a belt driving motor for driving the transferring belt and the roller of the fixing unit, and reference numeral 1622 denotes a fixing unit and a low voltage power supply unit, whose temperature is monitored by a thermister not shown through the control CPU so that the fixing temperature is kept constant.

An ASIC 1623 conducts the motor speed control inside the CMOS sensor 1611 and the optical units 1612 to 1615, and the speed control of the paper feeding motor on the basis of an instruction from the control CPU 10.

The motor speed control is conducted in such a manner that a tack signal from a motor not shown is detected, and an acceleration or deceleration signal is outputted to the motor so that an interval between the tack signals becomes a given period of time. For that reason, the control circuit is advantageously structured by a circuit made up of a hardware of the ASIC 1623 in that the control load of the CPU 1610 is reduced.

Upon receiving a print command in accordance with an instruction from a host computer not shown, the control CPU 1610 judges whether the recording material exists, or not, through the paper presence/absence sensor 1618, and if the paper exists, the control CPU 1610 drives the paper feeding motor 1616, the drum driving motor 1620, the belt driving motor 1621, and also drives the paper feed solenoid 1617 so as to convey the recording material up to a given position.

When the recording material is conveyed to the position of the CMOS sensor 1611, the control CPU issues to the ASIC 1623 image pickup instruction of CMOS sensor 1661, and the CMOS sensor 1611 picks up the image on the surface of the recording material.

In this situation, the ASIC 1623 outputs a SYSCLK of a given pulse at a given timing after making the SI-select active, and takes the image picked-up data that is outputted through the SI-out from the CMOS sensor 1611.

On the other hand, the gain setting of the CMOS sensor 1611 is conducted as follows. That is, after a value predetermined by the control CPU 1610 is set in a register within the ASIC 1623 to make the SI-select active by the ASIC 1623, the SYSCLK of the given pulse is outputted at the given timing to set the gain through the SI-in with respect to the CMOS sensor 1611.

The ASIC 1623 includes a circuit that is made up of first arithmetically operating means that arithmetically operates information pertaining to the size of the concave and convex portions described in the first embodiment and second arithmetically operating means that arithmetically operates information pertaining to the width of the concave and convex portions, and the respective arithmetically operated results are stored in a register within the ASIC 1623.

The CPU 1610 reads information in the register within the ASIC 1623, compares the read data with a parameter for each of the recording materials to discriminate the type of the fed recording material, and variably controls the development bias conditions of the high voltage power supply 1619 in accordance with the discriminated results.

For example, in the case where the recording material is a so-called rough paper whose surface fibers are coarse, the developing bias is made lower than that of the plain paper, and the amount of toner that adheres to the surface of the recording material is suppressed to prevent the toner from being scattered under the control. This is because particularly in case of the rough paper, the amount of toner that adheres to the surface of the recording material is large, such a problem that the toner is scattered due to the paper fibers to deteriorate the image quality is eliminated.

Also, the CPU 1610 discriminates the type of the fed recording material, and variably controls the temperature conditions of the fixing unit 1622 in accordance with the discriminated results.

This is effective to a problem that when the toner that adheres to the surface of the recording material is low in the fixing property, OHT transmittance is deteriorated, particularly in case of the OHT sheet.

In addition, the CPU 1610 discriminates the type of fed recording material, and variably controls of the conveying speed of the recording material in accordance with the discriminated result. The variable control of the conveying speed is realized by setting the speed control register value of the ASIC 1623 that controls the speed control by the CPU 1610.

This improves the fixing property of the toner that adheres to the surface of the recording material and enhances the gloss, thereby being capable of improving the image quality, in particularly when it is judged that the recording paper is the OHT sheet or the gloss paper.

As described above, in this embodiment, the first arithmetic operation and the second arithmetic operation are conducted by the hardware circuit of the ASIC from the image on the surface of the recording material which is picked up by the CMOS area sensor, and the CPU variably controls the developing condition of the high voltage power supply, the control temperature condition of the fixing unit or the conveying speed of the recording material on the basis of the first and second arithmetic operation results.

FIGS. 9 and 10 show the surface image in the case where the incident direction of the light source is 0 degree with respect to the fibrous direction, and the surface image in the case where the incident direction of the light source is 90 degrees with respect to the fibrous direction, on the same surface of the paper, respectively. The concave and convex portions on the paper cannot be perceived in case of 0 degree whereas the concave and convex portions on the paper can be perceived in case of 90 degrees.

FIGS. 11 and 12 show an image when the light irradiating direction is made incident from 45 degrees right-obliquely and an image when the light irradiating direction is made incident from 45 degrees left-obliquely, in the case where the same fibrous direction is longitudinal (vertical direction), respectively.

With an arrangement in which an angle between the light irradiating direction and the fibrous direction of the object to be read becomes a given angle, a difference in the image due to the orientation of the fibers of the paper can be suppressed, thereby being capable of conducting detection small in variation.

Figure 13:
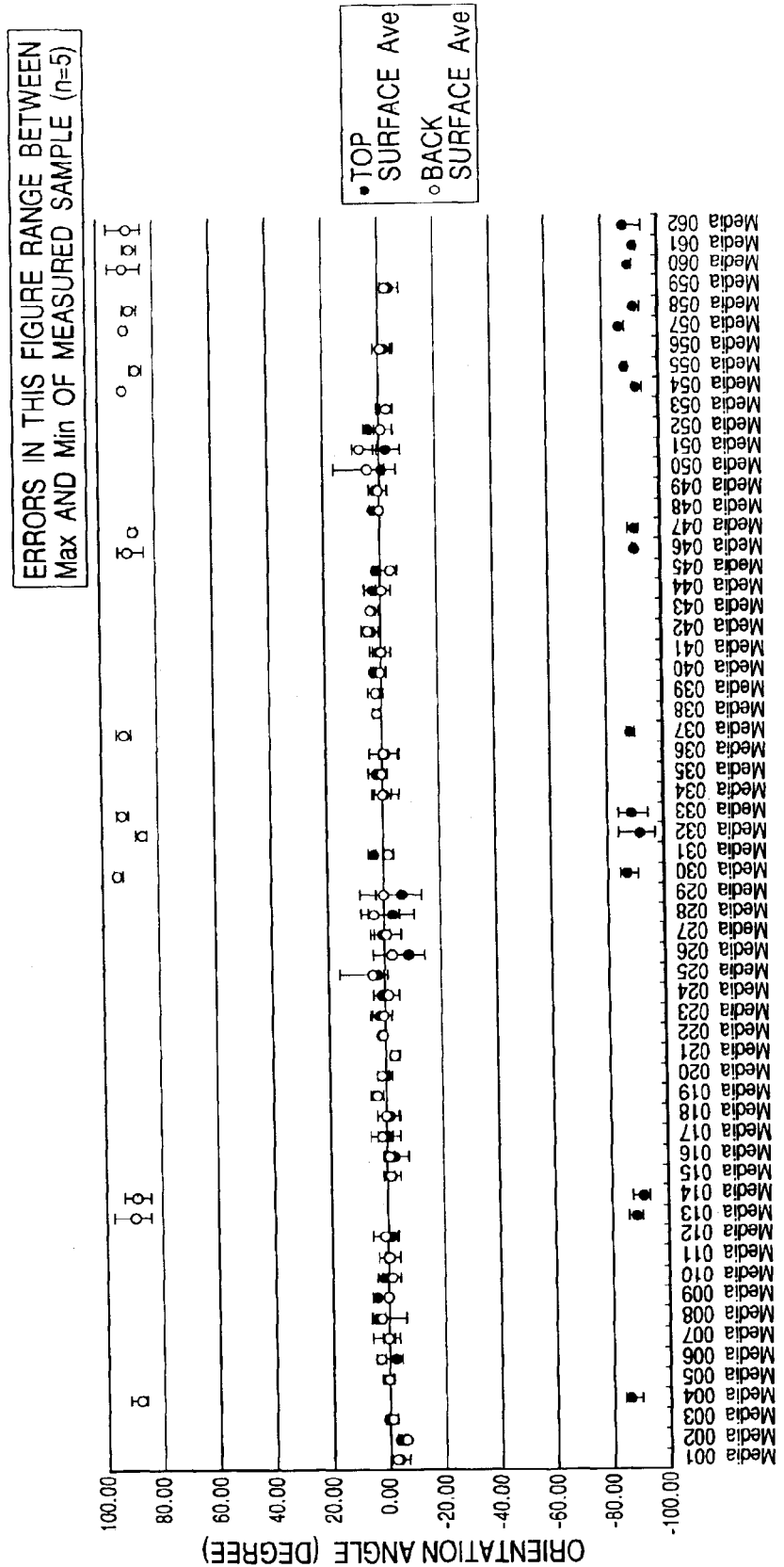
FIG. 13 is a distribution graph showing the fiber orientation angle of a paper for explaining the problem to be solved by the invention.
Figure 14:
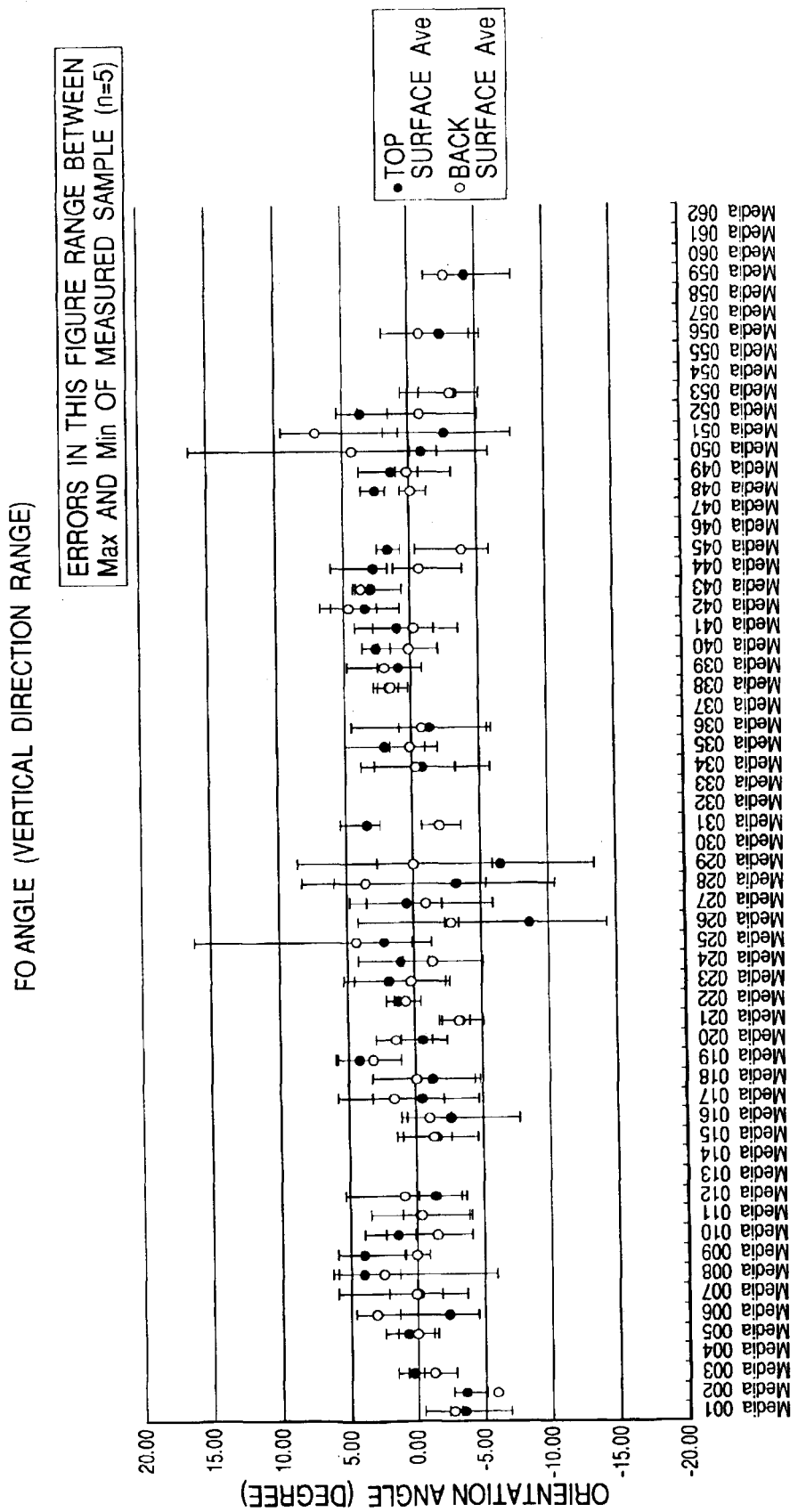
FIG. 14 is a distribution graph showing the fiber orientation angle of a paper for explaining the problem to be solved by the invention.
Figure 15:
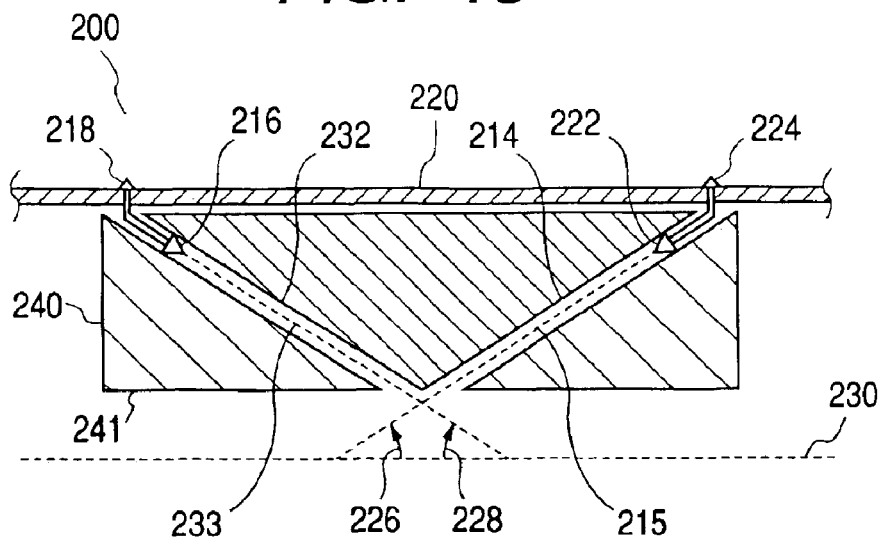
FIG. 15 is a cross-sectional view showing a printer gloss meter disclosed in Japanese Patent Application Laid-open No. 11-216938.
Figure 16:
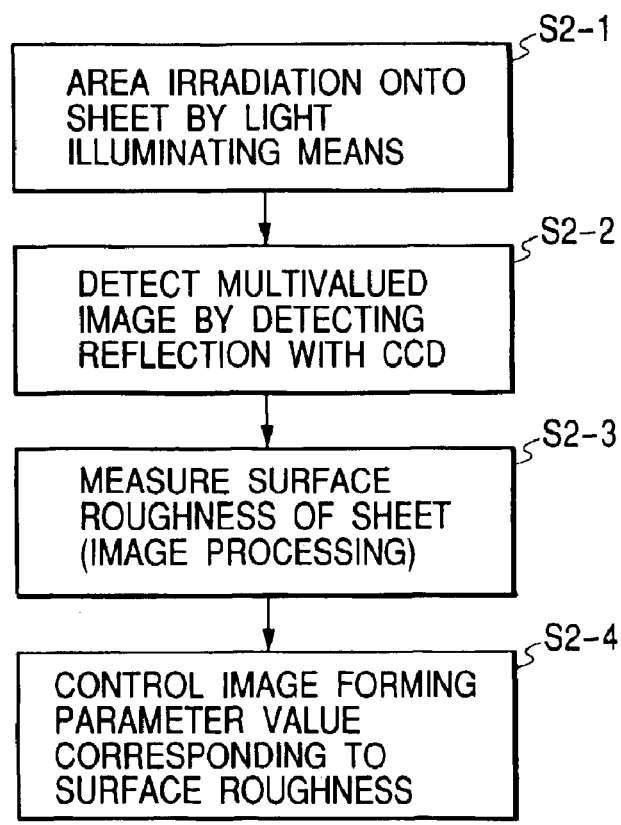
FIG. 16 is a flowchart showing a process of the basis operation of a flatness detecting device disclosed in Japanese Patent Application Laid-open No. 11-271037.

FIGS. 13 and 14 are distribution graphs showing the results obtained by measuring the fiber orientation angle of 63 kinds of recording materials that have been well known on the market by using a fiber orientation angle measuring unit.

The fiber orientation angle is an angle obtained from the aspect ratio of the fibers of the paper. It is found from those figures that the orientation angles of most of the papers are 0 degree or near 90 degrees, and a variation in the orientation angle is within 15 degrees. In this way, the fibrous directions of the papers are substantially classified into the vertical direction and the horizontal direction, and are substantially 0 degree or 90 degrees. For that reason, an arrangement is made such that the incident direction of the light source and the conveying direction of the paper are oblique to each other by about 45 degrees, thereby being capable of always keeping an angle between the fibrous direction and the light incident direction constant to substantially 45 degrees with the result that a detection precision of the sensor can be improved.

Also, in this example, it is not always unnecessary to provide 45 degrees. Since the orientation angles of most of the fibers (all of the recording materials that have been measured at this time) are 15 degrees or less, the effects of the present invention can sufficiently be obtained if the orientation angle is set to about +/−30 degrees.

As was described above, according to the above-mentioned embodiment, a precision in the detection can be enhanced by maintaining the incident direction of the light source with respect to the fibrous direction of the paper constant.

Therefore, with a structure in which an angle formed by the incident direction of the light source and the conveying direction of the recording medium is oblique, an influence of the fibrous direction of the paper can be suppressed. As a result, the flatness of the surface can more accurately be measured.

Several preferred embodiments of the present invention were described above, but the present invention is not limited to or by those embodiments, and it is apparent that various modifications or applications can be conducted within the scope of the claims.

What is claimed is:

1. A picture reading device, comprising:
   an illuminating unit adapted to illuminate a surface of a sheet to be read with light; and
   a reading unit adapted to read the illuminated surface of the sheet as a picture, for the purpose of calculating a roughness of the surface of the sheet based on the picture read by said reading unit,
   wherein said illuminating unit is arranged in such a manner that a line resulting from projecting a line connecting the illuminating unit and the reading unit on a surface of the sheet is oblique to a conveying direction of the sheet.

2. A picture reading device according to claim 1, wherein the projected line is oblique to the conveying direction with about 45 degrees.

3. A picture reading device according to claim 1, wherein the reading unit comprises one of a CMOS sensor and a CCD sensor each having a plurality of pixels, and the reading unit reads the surface of the sheet as a two-dimensional image.

4. An image forming apparatus, comprising:

an illuminating unit adapted to illuminate a surface of a recording material with light;

a reading unit adapted to read the illuminated surface of the recording material as a picture; and a calculating unit adapted to calculate a roughness of the recording material based on the picture read by said reading unit, wherein said illuminating unit is arranged in such a manner that a line resulting from projecting a line connecting the illuminating unit and the reading unit on a surface of the recording material is oblique to a conveying direction of the recording material.

5. An image forming apparatus according to claim 4, wherein the projected line is oblique to the conveying direction with about 45 degrees.

6. An image forming apparatus according to claim 4, wherein the reading unit comprises one of a CMOS sensor and a CCD sensor each comprising a plurality of pixels, and the reading unit reads the surface of the recording material as a two-dimensional image.

7. An image forming apparatus according to claim 4, further comprising a control unit adapted to control an image formation condition on the basis of the calculating results of the calculating unit.

8. An image forming apparatus according to claim 4, wherein the calculating unit calculates both of a size of concave and convex portions and a width of concave and convex portions on the recording material.

9. An image forming apparatus according to claim 4, further comprising a discriminating unit adapted to discriminate a type of the recording material on the basis of the calculating results of the calculating unit.

10. An image forming apparatus according to claim 9, further comprising a control unit to control an image formation condition on the basis of the discriminating results of the discriminating unit.

11. An image forming apparatus according to claim 10, wherein said image formation condition is developing condition on the basis of the discriminating results of the discriminating unit.

12. An image forming apparatus according to claim 10, wherein said image formation condition is temperature of a fixing unit on the basis of the discriminating results of the discriminating unit.

13. An image forming apparatus according to claim 10, wherein said image formation condition is conveying speed of the recording material on the basis of the discriminating results of the discriminating unit.

* * * * *

UNITED STATES PATENT AND TRADEMARK OFFICE
CERTIFICATE OF CORRECTION

PATENT NO. : 6,853,393 B2
DATED : February 8, 2005
INVENTOR(S) : Masanori Akita

It is certified that error appears in the above-identified patent and that said Letters Patent is hereby corrected as shown below:

Column 1,
Line 26, "refer" should read -- referred --.

Column 2,
Line 37, "in" should be deleted.
Line 50, "device" should read -- device, which --.
Line 66, "invention," should read -- invention is to provide --.
Line 67, "apparatus" should read -- apparatus, which --.

Column 5,
Line 4, "sets" should read -- set --.
Line 63, "operation is" should read -- operations are --.

Column 7,
Line 36, "to a problem that" should read -- for a problem wherein, --.
Line 38, "is deteriorated," should read -- deteriorates --.

Signed and Sealed this

Thirty-first Day of May, 2005

JON W. DUDAS
*Director of the United States Patent and Trademark Office*